T. M. DANIELS.
BEET TOPPING MACHINE.
APPLICATION FILED OCT. 3, 1918.

1,306,673.

Patented June 10, 1919.
3 SHEETS—SHEET 1.

WITNESSES
J. Herbert Bradley.
W. Herbert Fowkes

INVENTOR
Thomas Marion Daniels
By
Synnestvedt Lechner and Fowkes.
Attys.

T. M. DANIELS.
BEET TOPPING MACHINE.
APPLICATION FILED OCT. 3, 1918.
1,306,673.
Patented June 10, 1919.
3 SHEETS—SHEET 3.
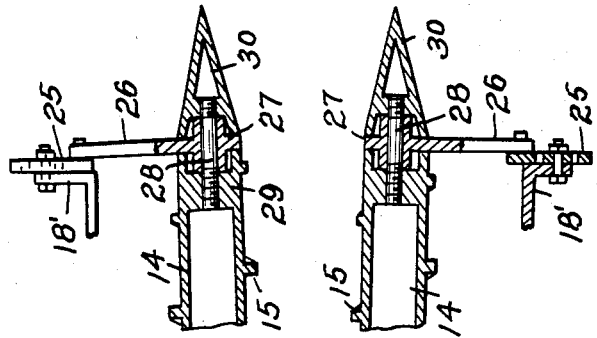
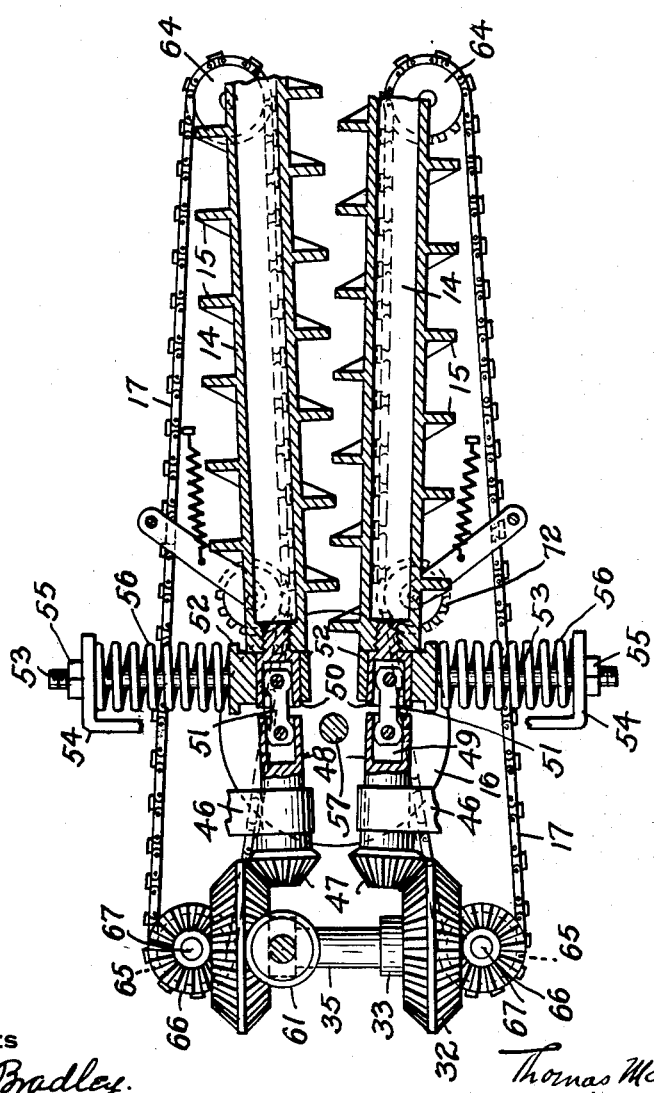
FIG. 3.
WITNESSES
J. Herbert Bradley.
W. Herbert Fowkes.
INVENTOR
Thomas Marion Daniels
By
Ernestwich Lechner and Fowkes,
Attys.

UNITED STATES PATENT OFFICE.

THOMAS MARION DANIELS, OF REDONDO BEACH, CALIFORNIA.

BEET-TOPPING MACHINE.

1,306,673.   Specification of Letters Patent.   Patented June 10, 1919.

Application filed October 3, 1918.   Serial No. 256,725.

*To all whom it may concern:*

Be it known that I, THOMAS MARION DANIELS, a citizen of the United States, residing at Redondo Beach, in the county of Los Angeles and State of California, have invented certain new and useful Improvements in Beet-Topping Machines, of which the following is a specification.

My invention relates to improvements in beet harvesters, and has for one of its primary objects the provision of beet topping apparatus capable of being readily attached to the frame of an ordinary beet puller or plow and which is adapted for delivering in a very efficient manner the pulled beets to a rotary knife where the beets are topped or crowned. Other objects of the invention are to provide novel mechanism comprising co-operating inclined rotary members helically formed and arranged in the puller frame to grip the tops of the beets and carry them rearwardly and upwardly to the topping knife; and to provide means for lowering and relatively adjusting said members.

My invention is characterized by improved efficiency and durability in use, and contemplates certain novel details of construction, combination and arrangement of parts of the improved apparatus, whereby these and other important advantages are attained, as will be more fully described hereinafter, and pointed out in the claims.

These, together with such other advantages as are incident to my invention, I attain by means of a construction illustrated in preferred form in the accompanying drawings, wherein—

Fig. 3 is a horizontal section view, slightly enlarged and taken in a plane through the spiral rolls which are shown broken away in order to accommodate the figure.

Figure 1:
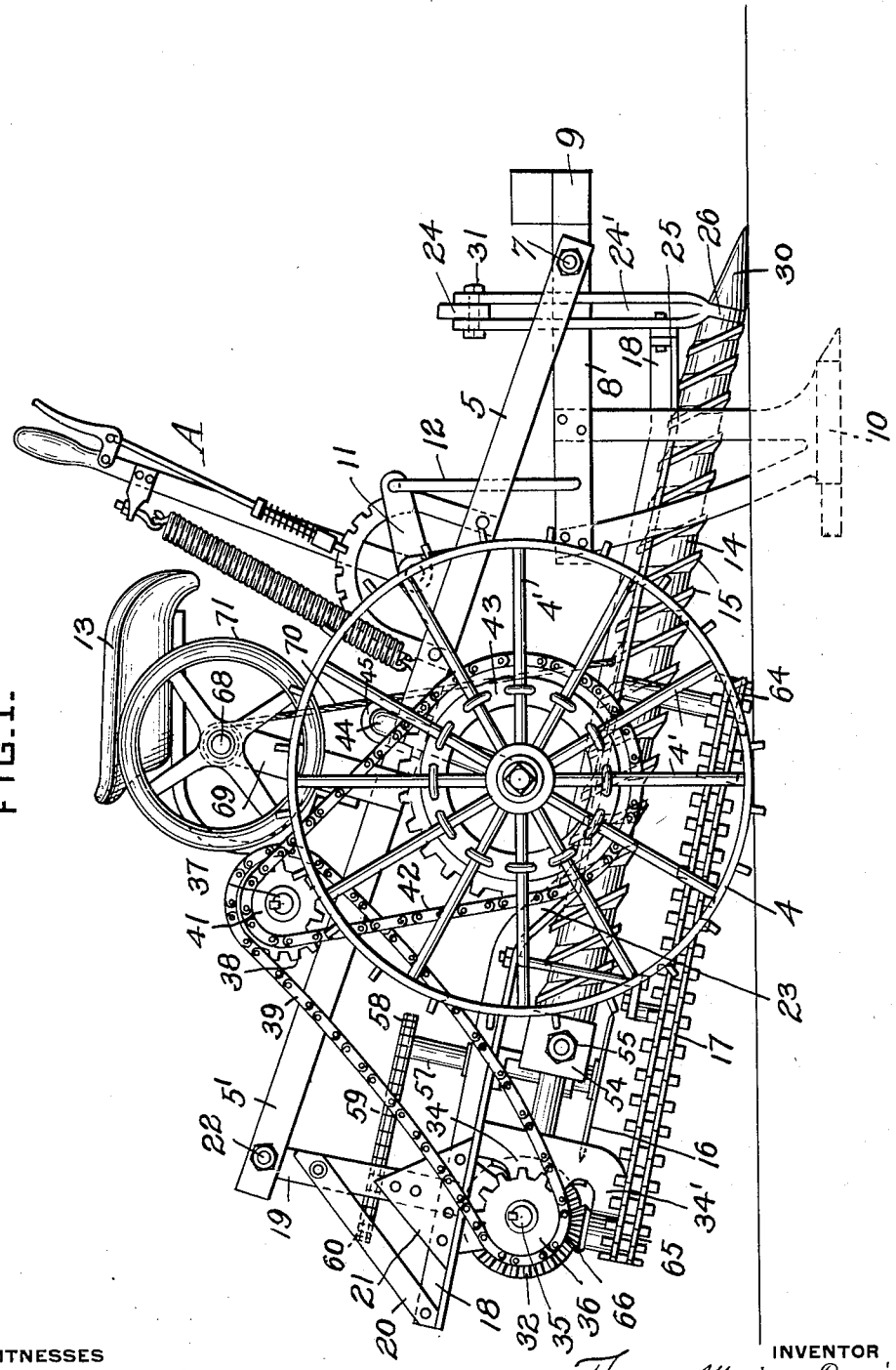
Figure 1 is a side elevation of a beet harvester to which my improved beet topping apparatus is shown applied.
Figure 2:
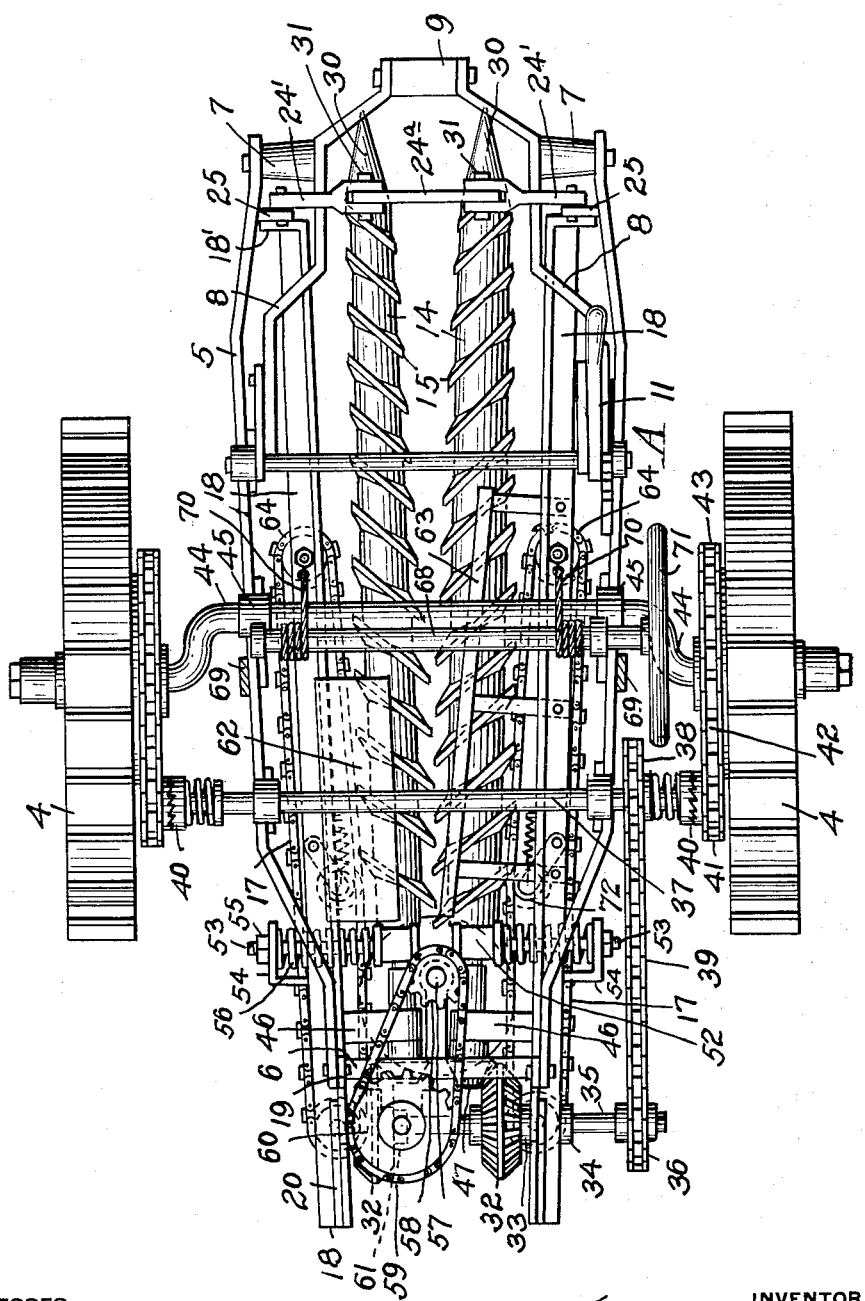
Fig. 2 represents a top plan view of Fig. 1, with the seat removed.

Referring to the drawings, the body or frame of the machine, as is customary in certain types of beet harvesters, consists of main and sub-frames, the former provided with wheels 4 and comprising longitudinal beams 5 connected by the rear end frame member 6 and in the front ends of which the sub-frame is pivotally mounted by means of the pivot lugs or extensions 7. The sub-frame may embody the side-frame members 8 and the forward draft rigging portion 9, and is provided with the plow-share 10 adapted to be pivotally raised and lowered by the lever mechanism, which is indicated in a general way by the reference character A, through the medium of the lever 11 and link 12 operatively connected to the sub-frame members 8. The above-recited structure with its adjuncts is old and well-known, in itself forms no part of my invention, and therefore detailed description and illustration of the same is deemed unnecessary. The reference numeral 13 denotes a seat carried by the main frame and positioned in close proximity to the lever mechanism.

In carrying out my invention, I provide a pair of rotary conveyer rollers 14 which have formed peripherally thereon helical ridges 15. These ridges or spirals are formed right-handed on the roller at the right hand side of the machine and left-handed on the other, and preferably are gradually reduced in height at their front ends until the spirals substantially merge into the bodies of their respective rollers. The latter are supported in an inclined plane between the main frame and the plow-share by means of a conveyer frame and are oppositely rotated by gearing mechanism, both hereinafter to be fully described, and when rotated their adjacent sides turn in an upward direction, the flanges carrying along and gripping the beet tops until the beets reach the topping knife 16 where they are topped or crowned. During the progression rearwardly of the beets, the latter, as distinguished from their tops, are also flexibly gripped by a supplementary conveyer means comprising a pair of chain conveyers 17 disposed underneath and in approximately the same plane as that of the rollers. It will be noted that the axes of the roller conveyers are not parallel, but preferably slightly converge toward the rear end of the machine until the rear spiral ridges are substantially in a meshed relation.

The frame carrying both the roller and endless belt conveyers, already referred to, is located below the main frame and, as shown, comprises the longitudinal side frame members or angle bars 18 which are spaced apart and have their rear ends pivotally suspended from the rear ends 5' of the frame members 5 by means of the upright bars 19 rigidly secured to the members 18 and braced by the brace members 20, 21, and which bars have their upper ends pivotally associated with the ends 5' by pivot bolts 22 for limited relative movement on these pivots. Intermediately of the wheels 4, these angle bars are bent downwardly and forwardly at 23 and have their front end portions provided with a yoke 24 whose arms 24' straddle advanced portions of the rollers and have adjustable connections 25 with the forward terminals 18' of the angle-bar frame members.

These arms also provide bearings for the roller front ends, the bearings being best illustrated at the top of Fig. 3, wherein the arms 24' are each terminally provided with an inwardly extending bearing arm 26, and a flanged bearing member 27 through which extends a pin or rod 28 threaded at one end to have a screw-threaded engagement with the roller neck 29, the other end having a similar engagement with the conical head 30. By means of the connection 25 relative axial adjustment of the roller conveyers may be obtained in a very facile manner and since the cones 30 are separate and spaced apart from the rollers proper, an effective front bearing is provided for each of the rollers. To permit of this roller adjustment the yoke arms 24' are pivotally connected at their upper forked ends by headed bolts 31 to the central body portion 24ᵃ of the yoke.

In order to impart rotary movement to the spiral conveyers 14, I provide a pair of connected double-faced bevel gears 32 adapted to concurrently rotate in bearings 33 carried by supports 34 secured to and depending from the conveyer frame members 18. These gears have a common shaft 35, at one end of which is keyed a spur gear 36. Carried on the main frame is a jack shaft 37 provided with a gear 38 having an endless belt drive connection 39 with gear 36, said shaft having ratchet connections 40 at its ends with gears 41 designed in turn to be driven by chain belt drives 42 which are passed about them and the bull gears 43, the latter being rigidly associated with the spokes 4' of the wheels 4. The axle 44 of the wheels is provided with bearings 45 in the upper or main frame members 5. Hence, as the machine travels forwardly, the bevel gears 32 will rotate in the same direction, namely, toward the front of the machine.

Carried in bearings 46, secured to the angle-bars 18, are bevel pinions 47 which are meshed with the inner toothed faces of the bevel gears 32, the stub-shafts 48 thereof each being hollow in formation to provide a socket 49 in alinement with a socket-piece 50 carried by each rear end of the rollers 14. These sockets are flexibly joined by the pivot pin 51; and I provide a bearing-box 52 for each socket piece to rotate in as the rotary movement of the bevel gears and pinions is transmitted to the spiral conveyers. In turn, each box 52 is rigidly provided with an outwardly extending rod 53 whose threaded outer terminal passes through an angle-bar extension 54 of angle-bar 18 to receive the nut 55. About each rod 53 is a coil spring 56 positioned to bear against the opposed inner faces of members 52 and 54 to exert the requisite tension upon the spiral conveyers 14 while in operation.

Journaled substantially intermediately of these couplings is the shaft 57 of the topping knife 16, which is provided at its upper end with a gear 58 having belt drive connections 59 with a spur gear 60 whose shaft is in turn provided with a bevel pinion 61 positioned to mesh with one of the bevel gears 32. In this manner rotation is thus imparted to the knife. Positioned above and in juxtaposition to the spiral conveyers, and extending toward the knife shaft, is a shield 62 and a guard 63, both carried by the conveyer frame, the guard being adapted to turn the leaves or tops over the shield from whence, after crowning, they drop to the ground, while the beets are still being held by the endless belts 17 in their progression toward the rear of the machine, where they are in turn dropped, but along a line or row distinct from that of the crowned tops.

These belt conveyers 17, are meshed and carried at one end by idler gears 64 and at the other and rear ends thereof by drive gears 65, each of which has a drive engagement with a bevel gear 32 by means of a bevel pinion 66, the shaft 67 of which is journaled in an extension 34' of the support 34.

The normal operative relation or inclination of the spiral rollers in their frame is substantially that indicated in Fig. 1, the inclination being about 30°. When considered advisable to elevate or raise the cone-heads, they may be so raised, or lowered, on the pivotal axis 22 by suitable means such as the shaft 68 which is journaled in extensions 69 of the main frame and provided with flexible cables 70 adapted upon actuation of the hand wheel 71 to be wrapped upon the shaft and thereby exert a raising pull upon the conveyer frame to whose members 18 the other ends of the cables are attached. Chain tightening mechanism, such as the spring-pressed roller 72, may be utilized to considerable advantage with the endless belt conveyers 17, and these, as shown, are positioned to press inwardly the inner stretch of each belt so as to present an hour-glass shaped or convergent-divergent passage to the beets proper, and further afford the necessary flexibility and adjustability to the conveyers so as to accommodate varying sizes of beets, and the different conditions met with in the field.

The operation is briefly as follows. With the spiral conveyers adjusted so that their conical heads just touch the ground at each side of a row of beets, the machine is driven in a forward direction, and as the plows loosen the beets the points of the heads are in position to pass under the leaves, the stems of which pass upwardly and rearwardly between the spiral conveyers until they reach a position where the spirals are close enough to grip the leaves, whereupon the leaves are lifted until the tops of the beets strike the lower side of the guard. This serves to check this upward movement and the helical configuration of the roller conveyers causes the beets to continue their rearward movement until their tops are removed by the circular topping knife, the beets meanwhile being supported and conveyed rearwardly by the endless belt conveyers. As the tops are severed they are drawn in an upward direction between the rear end of the spiral conveyers and are discharged at one side of the line of discharge of the beets. In practice, the gearing and other drive mechanism are so arranged that the spiral conveyers rotate approximately twenty revolutions and the knife about fifty-five to one revolution of the main wheels. It will be obvious that instead of the power being transmitted to the working or moving parts by the forward movement of the machine, the power may be transmitted by other sources of power, such as, for example, a tractor. Nor do I wish to be understood as limiting myself to the exact arrangement or to the percise construction of the various parts of the apparatus, as it is apparent that modifications thereof may be made without in any way departing from the spirit and scope of my invention as pointed out in the following claims.

What I claim is:

1. In beet topping apparatus, the combination of a supporting frame, a pair of rotary spiral conveyers arranged in said frame to engage the tops of the beets, supplementary resilient beet-conveying means disposed below said conveyers and extending from a point near the transverse median line of said spiral conveyers to a point beyond their rear ends, and a beet topping element positioned between the rear ends of said conveyers and said means, the front ends of said conveyers and said means disposed in substantially the same plane.

2. In apparatus of the character described, and in combination, a supporting frame, a plurality of movable conveyers constructed and arranged in said frame to engage the tops of the beets, supplementary beet-conveying endless belts mounted for movement below said conveyers and having vertical belt-driving elements mounted in said frame, a rotary beet topping element positioned in said frame intermediately of said belts and said conveyers, said belts and said conveyers coöperating to convey the beets in a rearward and upward direction, and gearing positioned rearwardly of said beet topping elements for simultaneously imparting movement to said belt-driving elements and said conveyers.

3. In a beet topper, a supporting frame, a plurality of inclined depending beet-conveyer members carried in a spaced apart relation by said frame and adapted for lateral adjustment, and a beet topping element, said members arranged in pairs and having their inner faces inclined toward said element.

4. In a beet topper, the combination of a main wheeled frame, a conveyer frame carried thereby, a beet topping element disposed in one of said frames, front and rear bearings and actuating gearing mounted in the conveyer frame, and a rotary beet-conveyer device carried in said bearings and adapted to be actuated by said gearing, said frames being relatively movable.

5. In a beet topper, the combination of a main wheeled frame, a conveyer frame carried thereby, a beet topping element disposed in one of said frames, front and rear bearings and actuating gearing mounted in the conveyer frame, and a rotary beet-conveyer device carried in said bearings and adapted to be actuated by said gearing, said frames being relatively movable, and said bearings adapted for lateral adjustment in said conveyer frame, and drive connections between said wheeled frame and said gearing.

6. In a beet topper, a supporting frame, a plurality of inclined depending beet-conveyer members carried in a spaced apart relation by said frame and adapted for lateral adjustment, and a beet topping element, said members arranged in pairs and having their inner faces inclined toward said element, and guard means carried in said frame above said members and said topping element.

7. In a beet topper, the combination of a supporting frame provided with front and rear bearings, a pair of coöperating rotary spiral conveyers carried by said bearings in an inclined position and provided with conoidal heads in advance of the front bearings.

8. In a beet topper, the combination of a supporting frame provided with front and rear bearings, a pair of coöperating rotary spiral conveyers carried by said bearings in an inclined position and provided with conoidal heads in advance of the front bearings, the rear ends of said members capable of slight lateral movement, and spring-pressed means mounted in said frame to yieldingly act against said rear ends during lateral movement.

9. In a beet topper, the combination of a supporting frame provided at its front end with a yoke and at its rear end with gearing, a beet topping knife intermediate said yoke and gearing, and a rotary beet-conveying device having bearings in said yoke and adapted to be actuated by said gearing.

10. In a beet topper, the combination of a supporting frame provided near its front end with a yoke and with gearing near its rear end, a beet topping element in said frame, and beet-conveying devices operatively positioned adjacent said element and adapted to be actuated by said gearing, one of said devices having a bearing in said yoke.

11. In a beet topper, the combination of a wheeled frame, a conveyer frame pivotally carried in said frame and provided with a yoke and a gearing mechanism, means for raising and lowering said conveyer frame, a pair of forwardly and downwardly-inclined rotary spiral conveyers having a front bearing in said yoke, and a beet-supporting means disposed beneath said conveyers and having a beet-topping element positioned adjacent thereto, said conveyers laterally movable and having drive connections with said mechanism.

12. In a beet topper, the combination with a wheeled frame and a conveyer frame carried thereby, said conveyer frame provided rearwardly with a gear mechanism operatively connected with said wheeled frame and with a front yoke having adjustable arms constituting bearings, a pair of rotary spiral conveyers mounted in said bearings and having tapered heads positioned in advance of said bearings, a beet topping element, said conveyers forwardly and downwardly inclined from said element and having connections with and adapted to be rotated by said gearing mechanism, yielding positioning means for said connections, and beet supporting means positioned below said spiral conveyers.

13. In combination, a frame having a yoke provided with spaced bearings, a pair of spiral conveyers comprising main body members having forward extensions passing through said bearings and tapered heads carried by said extensions in advance of said bearings, gearing in said frame having shafts flexibly connected with the rear portions of said members, and yielding means in said frame for said rear portions.

14. In a beet topper, the combination of a frame having front and rear bearings, a beet topping element, actuating means mounted in said frame, a rotary beet-conveyer device carried in said bearings with reference to said beet topping element and adapted to be actuated by said means, and a plow in said frame, said device occupying an inclined position in the frame and having a portion thereof extended in advance of said plow.

15. In apparatus of the character described, the combination of a frame, a plow in said frame, a pair of rotary spiral conveyers extending in said frame to a point in advance of said plow and arranged to engage the tops of the beets, a pair of yielding coöperating beet gripping members disposed below said conveyers and rearwardly of said plow, and a beet topping element positioned in said frame between the gripping members and the conveyers.

16. In apparatus of the character described, the combination of a frame, a plow in said frame, a pair of rotary spiral conveyers extending in said frame to a point in advance of said plow and arranged to engage the tops of the beets, a pair of yielding coöperating beet gripping members disposed below said conveyers and rearwardly of said plow, a beet topping element positioned in said frame between the gripping members and the conveyers to top the beets while they are gripped by said members, and a guard member for said conveyers.

THOMAS MARION DANIELS.